United States Patent
Sleder, Sr. et al.

[19]

[11] Patent Number: 5,998,902
[45] Date of Patent: Dec. 7, 1999

[54] MAGNET RING ASSEMBLY FOR AN ELECTRICAL GENERATOR

[75] Inventors: Richard L. Sleder, Sr., Fond du Lac; Steven J. Gonring, Slinger; Kenneth E. Peterson, Fond du Lac, all of Wis.

[73] Assignee: Brunswick Corporation, Lake Forest, Ill.

[21] Appl. No.: 09/250,214

[22] Filed: Feb. 15, 1999

[51] Int. Cl.[6] .................................................. H02K 21/22
[52] U.S. Cl. .......................... 310/153; 310/156; 310/91; 74/572; 123/149 D
[58] Field of Search ................................. 310/153, 156, 310/74, 91; 74/572; 123/149 D

[56] References Cited

U.S. PATENT DOCUMENTS

| | | | |
|---|---|---|---|
| 2,945,138 | 7/1960 | Strang | 310/153 |
| 3,258,623 | 6/1966 | Phelon et al. | 310/156 |
| 3,657,582 | 4/1972 | Phelon | 310/156 |
| 3,818,586 | 6/1974 | Harkness et al. | 29/598 |
| 4,012,651 | 3/1977 | Burson | 310/153 |
| 4,137,884 | 2/1979 | Oazima et al. | 310/153 |
| 4,219,752 | 8/1980 | Katou | 310/156 |
| 4,227,105 | 10/1980 | Kumakura | 310/153 |
| 4,241,620 | 12/1980 | Pichl et al. | 74/573 R |
| 4,295,070 | 10/1981 | Johansson | 310/70 R |
| 4,423,345 | 12/1983 | Nilsson | 310/153 |
| 4,433,473 | 2/1984 | Benedetti | 29/598 |
| 4,701,654 | 10/1987 | Tatukawa et al. | 310/153 |
| 4,877,986 | 10/1989 | Shimizu | 310/153 |
| 4,916,343 | 4/1990 | Umemoto et al. | 310/153 |
| 4,980,592 | 12/1990 | Okmr et al. | 310/153 |
| 5,015,901 | 5/1991 | Phelon et al. | 310/153 |

*Primary Examiner*—Nestor Ramirez
*Assistant Examiner*—Joseph Waks
*Attorney, Agent, or Firm*—William D. Lanyi

[57] ABSTRACT

A magnet rotor assembly is provided with a nonmagnetic ring, which can be made of an elastomeric material, which has at least one locating protrusion extending radially outward from a first surface of the ring. It also comprises at least one locking protrusion extending radially outward from the second surface of the ring. A plurality of permanent magnets are embedded within the nonmagnetic ring and spaced circumferentially around the nonmagnetic ring. The ring is shaped to be received within a rotatable component of an internal combustion engine, such as a flywheel, which has an internal cylindrical surface. The locking protrusions of the ring are shaped to elastically deflect in a radially inward direction in response to contact between the locking protrusions and the internal cylindrical surface of the rotatable component when the nonmagnetic ring is forced axially into the rotatable component. The locking protrusions then elastically rebound in a radially outward direction to move into a groove which is formed in the internal cylindrical surface only after the locating protrusions move axially into notches formed in the rotatable component.

15 Claims, 4 Drawing Sheets

MAGNET RING ASSEMBLY FOR AN ELECTRICAL GENERATOR

BACKGROUND OF THE INVENTION

1. Field of the Invention

The present invention is generally related to a magnet rotor assembly that is used in conjunction with a flywheel to generate electrical current for use by an internal combustion engine and, more particularly, to a magnet rotor assembly in which the individual permanent magnets are solidly embedded within a non magnetic ring which is shaped to be permanently received within a flywheel of an internal combustion engine.

2. Description of the Prior Art

Many different types of electrical generators are known for use with internal combustion engines to provide electrical current for use by the internal combustion engine, primarily in its battery charging and ignition circuits. These electrical generating systems typically use a plurality of permanent magnets in conjunction with a rotatable flywheel of the internal combustion engine to induce current flow through a plurality of windings disposed proximate the circular paths of the permanent magnets. These electrical generating systems are made by numerous different processes and are of various different shapes and configurations.

U.S. Pat. No. 4,241,620, which issued to Pichl et al on Dec. 30, 1980, describes a balance wheel for rotating machines, especially combustion engines, including outboard motors. Typically, such balance wheels or flywheels have been manufactured from different non-ferrous metals as zinc or aluminum alloys, and in one embodiment they have the shape of an inverted pot having low side walls. On the inner side of the walls balance wheel magnets, such as permanent magnets for the ignition or generator system of the motor, are attached and the other elements of the ignition or generator systems are disposed outwardly around the output shaft of the engine and inside the pot. However, for obtaining a suitable magnetic field, the permanent magnets are not attached directly to the balance wheel of a non-magnetic material, but on a ring of magnetic material, for instance steel, which in its turn is attached to the balance wheel.

U.S. Pat. No. 4,423,345, which issued to Nilsson on Dec. 27, 1983, discloses a magneto flywheel assembly which includes arcuate ceramic magnets of non-uniform radial thickness. A rotor for the flywheel is made of soft material. The magnets of the magneto flywheel have a set of radial poles of alternating polarity, and another set of opposite poles directed towards the cylindrical periphery of the magneto rotor. A ferromagnetic band of deflectible material with the surface projection is disposed between the rotor and the magnets.

U.S. Pat. No. 5,015,901, which issued to Phelon et al on May 14, 1991, describes a rotor of a magnetmotive device. It has a discreet permanent magnet and a ferromagnetic core injection molded within a synthetic plastic body in the form of a flywheel. The core is of integral laminar construction and includes hub and counterweight portions and a pair of radially extending, circumferentially spaced arm portions. At their outer ends, the arm portions terminate in pole shoes with opposed, undercut edges to retain the discrete permanent magnet therebetween. Each of the arm portions has a laterally extending shoulder portion and, at their inner ends, connect to the hub by narrow neck or stem portions which are resiliently flexible. From the center of rotation of the rotor, the stem portions are each disposed along a given radius. Each of the arm portions of the core is characterized by a configuration and distribution of mass so that its center of gravity is located outward of the given radius whereby centrifugal force generated by high speed rotation of the rotor exerts opposing, inwardly directed forces on the arm portions for clamping the magnet therebetween.

U.S. Pat. No. 4,980,592, which issued to Olmr et al on Dec. 25, 1990, discloses a flywheel magnet rotor assembly. The assembly comprises a core, a magnet, two pole shoes and a molded resin disk. The core is comprised of metallic nonferromagnetic material forming a general can shape with apertures through a first wall. The magnet is sandwiched between the pole shoes inside the can shape and portions of the pole shoes extend out of the apertures. The molded resin disk substantially surrounds the core.

U.S. Pat. No. 4,916,343, which issued to Umemoto et al on Apr. 10, 1990, discloses a multi-pickup sensor bracket for a magneto. An engine igniting signal generation apparatus comprises a flywheel rotatable with the crank shaft of an internal combustion engine, a field magnet attached to the flywheel, and a plurality of pickup devices provided facing the field magnet to produce ignition signals in synchronism with the rotation of the flywheel. The cores of the pickup devices are formed by a substrate body of one piece; each coil wound around the cores connects to a terminal, to output the ignition signals, and is covered with an insulating material.

U.S. Pat. No. 4,433,473, which issued to Benedetti on Feb. 28, 1984, describes a process for manufacturing a flywheel magneto. The method is disclosed for manufacturing a flywheel magneto of the radial magnetic flux type for motor bicycles, motor scooters and the like, which comprises the steps of forming a subassembly comprised of a ring, the magnets, the pole shoes by scotching the ring on a plurality of wedges placed around a cylindrical body whereafter the pole shoes and an inner ring of a metallic nonmagnetic material are positioned and a punch rams all these component parts forcibly together. Finally, the subassembly so composed is surrounded by a casting of the nonmagnetic material.

U.S. Pat. No. 4,295,070, which issued to Johansson on Oct. 13, 1981, discloses a means for providing a mechanically definable selected trigger interval in a flywheel magneto. The ignition apparatus for internal combustion engines provided with flywheel magnetos, the ignition spark interval is purely mechanically provided at the manufacturing stage. In the direction of rotation, the edges of both pole shoes and core legs which meet each other are sharply defined. The pole shoe, first in the direction of rotation, is formed so that it substantially coacts with the leg, second in the direction of rotation, when the leading edge of the second pole shoe comes into coaction with the front edge of the leg situated first.

U.S. Pat. No. 4,877,986, which issued to Shimizu on Oct. 31, 1989, describes a rotor of a magnetic generator. The rotor has a plurality of permanent magnets disposed on an inner surface of a peripheral wall of a bowl-shaped flywheel. The permanent magnets are held in place by a magnet holding cylinder having plural outward protrusions formed in a radial direction at a first open end and an outward flange formed on a second open end thereof. Resin is provided to fill empty spaces of this assembly so that the magnets, the magnet holding cylinder and the flywheel are made of an integral piece thereof.

It would be beneficial if a magnet wheel could be provided which firmly holds the magneto in place and is easy to accurately position the magneto in their proper locations.

SUMMARY OF THE INVENTION

A preferred embodiment of the present invention provides a magnet rotor assembly which comprises a nonmagnetic ring, a locating protrusion extending radially outward from a first surface of the ring, and a locking protrusion extending radially outward from a second surface of the ring. In addition, a plurality of permanent magnets are embedded within the nonmagnetic ring and spaced circumferentially around the nonmagnetic ring. The ring is shaped to be received within a rotatable component of an internal combustion engine having an internal cylindrical surface. This rotatable component can be a flywheel of the internal combustion engine. The flywheel is made of a ferrous material, such as cast iron, and is an integral part of the magnetic circuit. The locking protrusion is shaped to elastically deflect in a radially inward direction in response to contact between the locking protrusion and the internal cylindrical surface of the rotatable component when the nonmagnetic ring is forced axially into the rotatable component. The locking protrusion then elastically rebounds in a radially outward direction into a groove formed in the internal cylindrical surface after the locating protrusion moves axially into a notch formed in the rotatable component.

The nonmagnetic ring can be made of elastomeric material. In addition, two locating protrusions can be provided instead of a single locating protrusion and the two locating protrusions can extend radially outward from the first surface of the ring. The two locating protrusions can be disposed at diametrically opposite positions on the ring.

The locking protrusion can extend circumferentially around the outer periphery of the ring.

The magnetic rotor assembly can be combined with the rotatable component by forcing it axially into the rotatable component until the locking protrusion rebounds in a radially outward direction, as described above and locks the magnet rotor into the rotatable component.

BRIEF DESCRIPTION OF THE DRAWINGS

The present invention will be more fully and completely understood from reading the description of the preferred embodiment in conjunction with the drawings, in which.

DESCRIPTION OF THE PREFERRED EMBODIMENT

Figure 1:
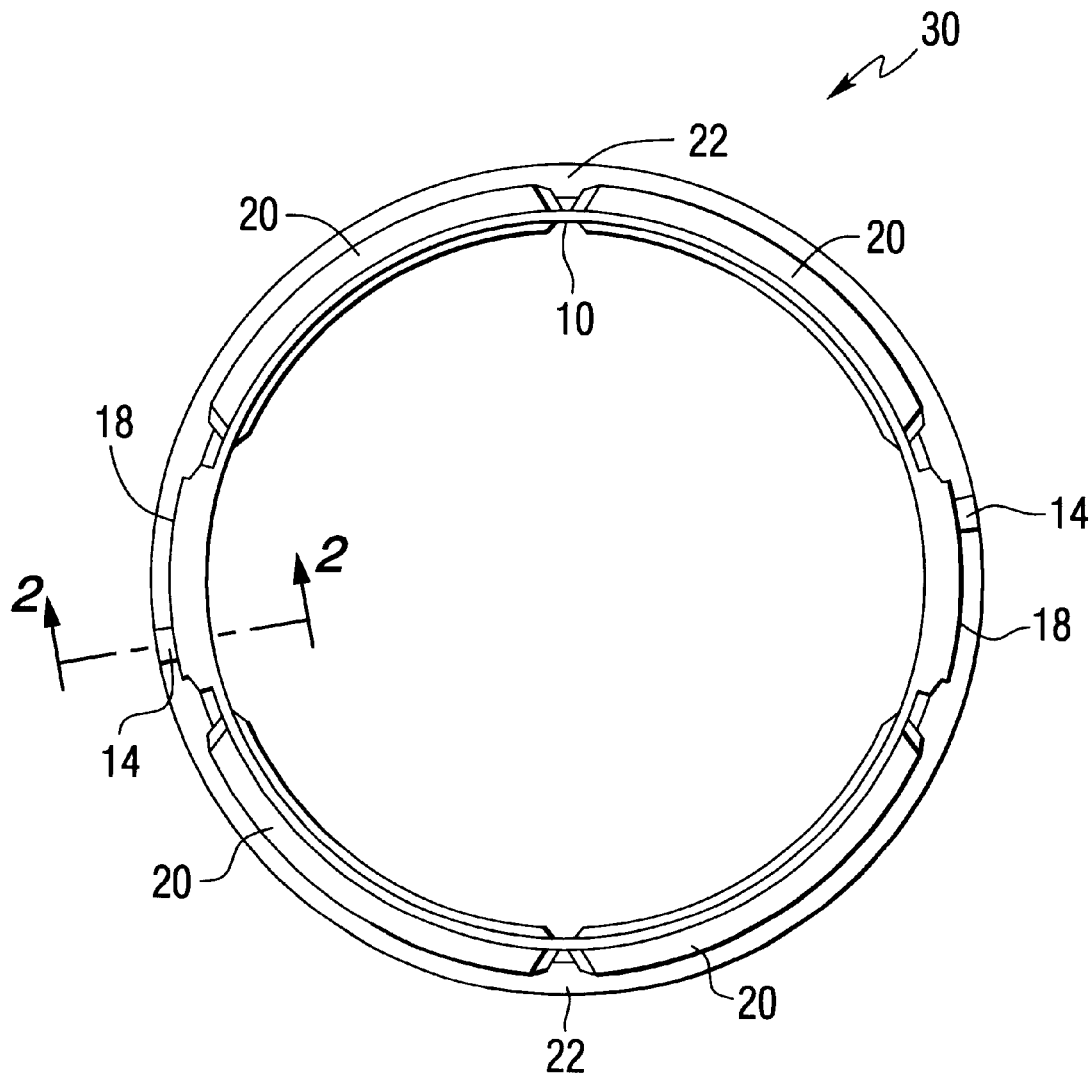
FIG. 1 is an end view of a magnetic rotor assembly ring made in accordance with the present invention.

Throughout the description of the preferred embodiment of the present invention, like components will be identified by like reference numerals.

FIG. 1 shows the magnet rotor assembly which comprises a nonmagnetic ring 10, a locating protrusion 14, and a locking protrusion 18. A plurality of permanent magnets 20 are embedded within the nonmagnetic ring 10. As can be seen in FIG. 1, the magnet rotor assembly comprises two locating protrusions 14 which are disposed at diametrically opposite positions on the ring. In addition, the embodiment shown in FIG. 1 also comprises two locking protrusions 18 which are also disposed at diametrically opposite sides of the ring 10.

Figure 2:
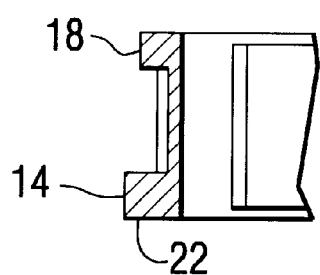
FIG. 2 is a section view of FIG. 1.

FIG. 2 is a section view of the ring 10 shown in FIG. 1. Although not clearly visible in FIG. 2, it should be understood that the locating protrusion 14 is formed as a raised portion of the rim 22.

Figure 3:
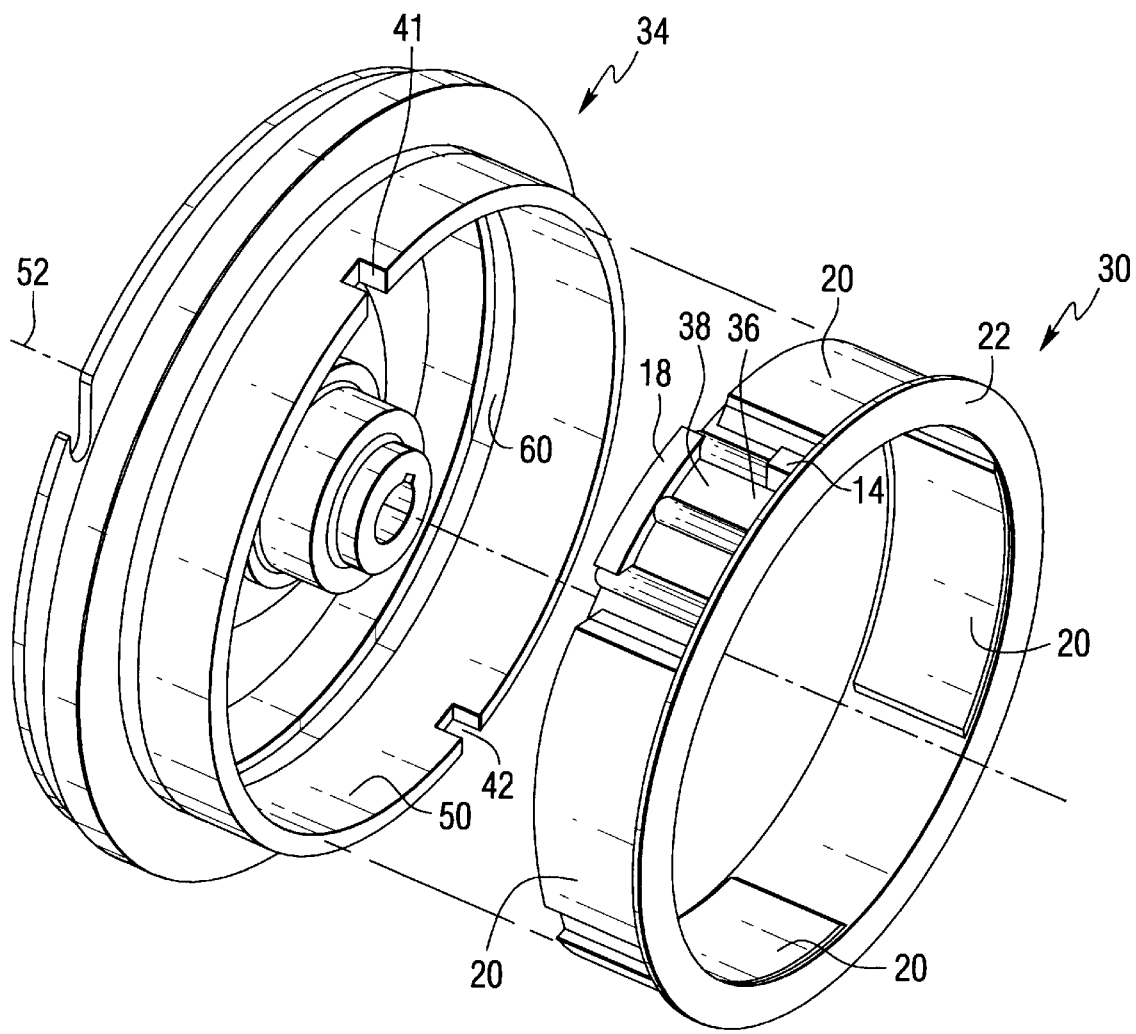
FIG. 3 is an isometric exploded view showing both the nonmagnetic ring and the rotatable component into which it can be assembled.

FIG. 3 shows the magnet rotor assembly 30 associated with a flywheel 34. The components are shown in a isometric view which more clearly illustrates how the locating protrusion 14 is a raised portion of the annular rim 22. It can also be seen that the locating protrusion 14 extends radially outward from a first surface 36 of the magnet rotor assembly 30 and that the locking protrusion 18 extends radially outward from a second surface 38 of the rotor assembly. In certain embodiments of the present invention, both the locating protrusion 14 and the locking protrusion 18 extend radially outward from the same surface of the ring.

With continued reference to FIG. 3, two notches, 41 and 42, are formed in the flywheel, or rotatable component of an internal combustion engine. These notches must be aligned with the locating protrusions 14 in order to completely push the magnet rotor assembly 30 axially into the flywheel 34 in a direction parallel to axis 52. In FIG. 3, an internal cylindrical surface 50 of the rotatable component is shown. When the ring 30 is forced axially into the rotatable component 34, the locking protrusions 18 are caused to elastically deflect in a radially inward direction in response to the contact between the locking protrusions 18 and the internal cylindrical surface 50. The effective diameter of the ring 30, measured at the locking protrusions 18 is decreased by this elastic deflection. As the ring 30 is forced axially into the rotatable component 34, the locking protrusions 18 eventually move into the location of a groove 60 formed in the internal cylindrical surface 50. When this occurs, the locking protrusions 18 elastically rebound in a radially outward direction and into the groove 60 which is formed in the internal cylindrical surface 50 of the rotatable component 34.

The ring 30 is dimensionally constructed so that the locating protrusions 14 must be aligned with and inserted axially into the notches, 41 and 42, in order for the locking protrusions 18 to move sufficiently in an axial direction to elastically rebound in a radially outward direction into the groove 60. When the locking protrusions 18 rebound elastically into the groove 60, the ring 30 is locked permanently into the rotatable component 34 and cannot be removed without deforming and seriously damaging the ring 30. For the purpose of preventing circumferential movement of the ring 30 relative to the rotatable component 34, the ring 30 is sized to result in a press fit within the rotatable component 34. When the ring 30 is forced or pressed into the rotatable component 34, the ring is compressed radially to provide a preload on the ring which results in a radially outward force against the internal cylindrical surface 50. This force assists in preventing circumferential movement of the ring relative to the rotatable component 34.

Figure 5:
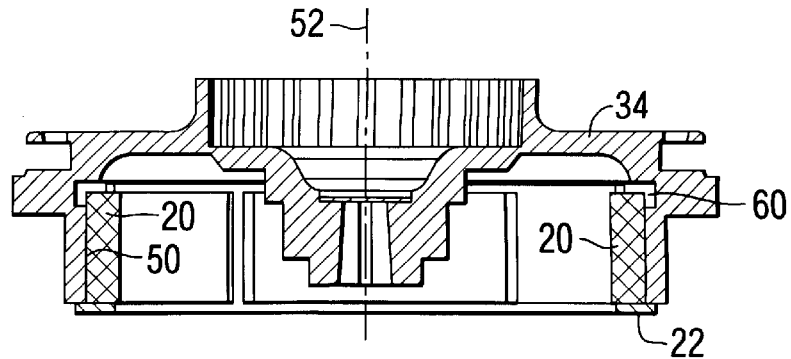
FIGS. 5 and 6 are section views of FIG. 4.
Figure 4:
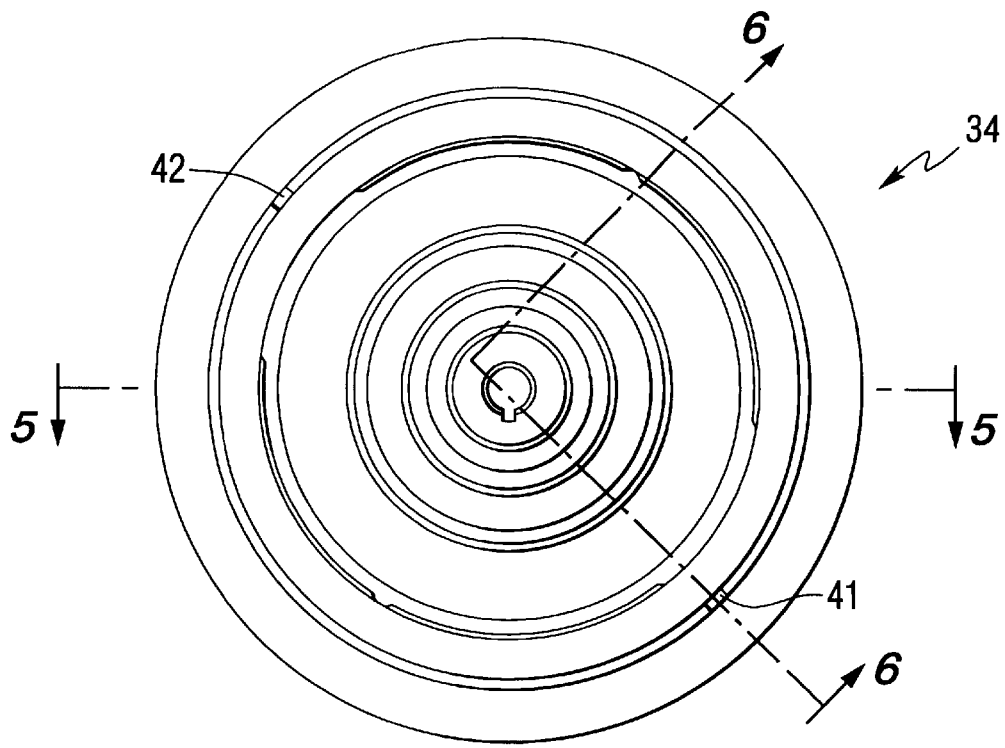
FIG. 4 is an end view of an assembly which consists of a magnet ring and a rotatable component, such like a flywheel.
Figure 6:
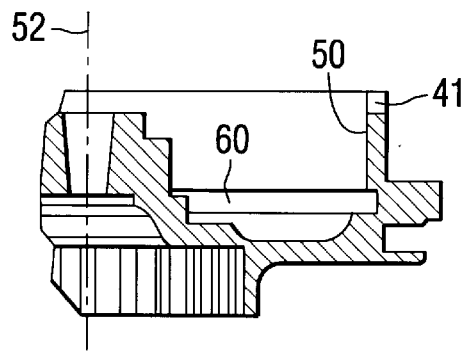

FIG. 4 shows the rotatable component 34. FIG. 5 is a section view of FIG. 4. FIG. 6 is a different section view of FIG. 4.

In FIG. 5, a rotatable component 34 can be seen with its internal cylindrical surface 50 which can be tapered to assist in the assembly of the components. The angular rim 22 of the ring of the magnet rotor assembly 30 is also shown with the magnets 20. When the ring 30 is forced axially into the rotatable component 34, the magnets 20 slide along the internal cylindrical surface 50. In addition, the locking protrusions 18 are caused to elastically deflect radially inward, toward centerline 52, in response to contact with the internal cylindrical surface 50 until they reach the axial position of the groove 60 at which time they can elastically rebound in a radially outward direction into the groove 60 to lock the ring into position within the rotatable component 34 if the locating protrusions are aligned with notches 41 and 42.

The section view shown in FIG. 6 is illustrated without the ring 30 in place. With the ring 30 removed, FIG. 6 shows the relative positions of the internal cylindrical surface 50, the groove 60, and notch 41.

Figure 7:
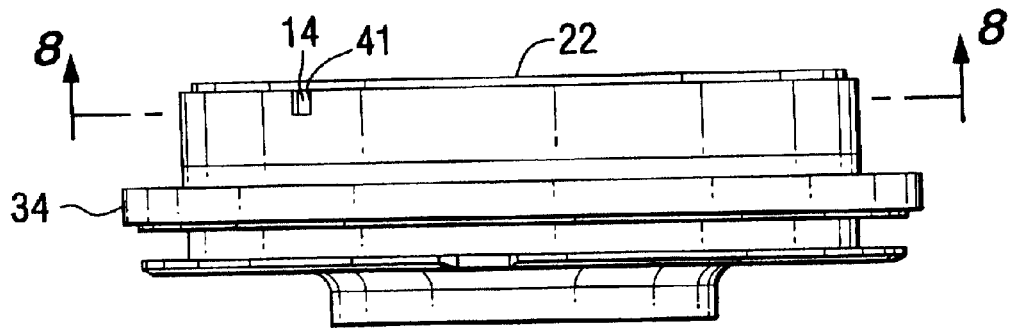
FIG. 7 is a side view of an assembly which includes both a flywheel and a magnet ring.
Figure 8:
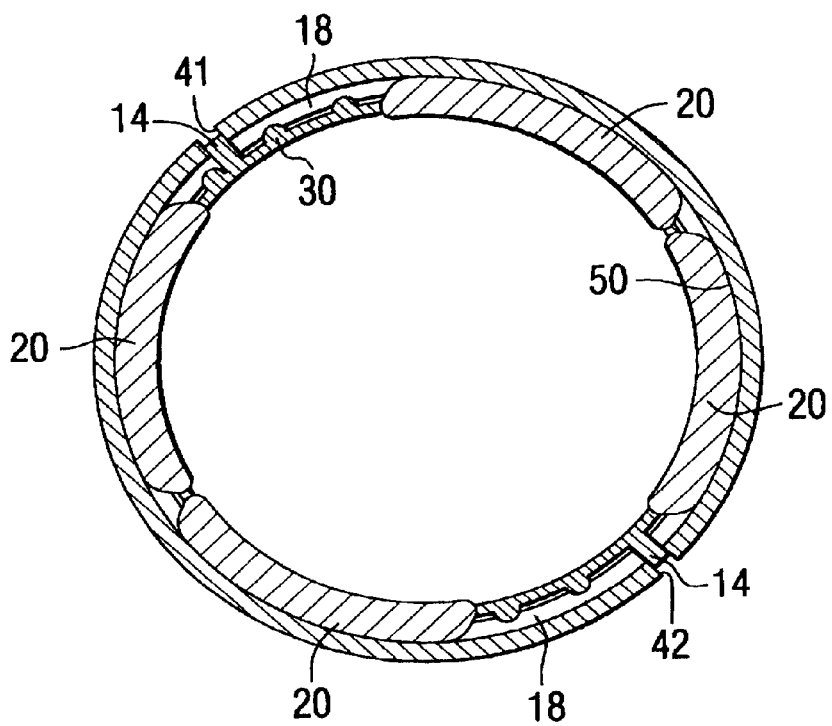
FIG. 8 is a section view of FIG. 7.

FIG. 7 is a side view of the assembled system which includes both the rotatable component 34 and the ring 30. In FIG. 7, only the annular rim 22 of the ring 30 can be seen, along with the locating protrusion 14 which is disposed within notch 41. FIG. 8 is a section view of FIG. 7.

In FIG. 8, the locating protrusions 14 can more clearly be seen disposed within the two notches, 41 and 42, with the four magnets 20 disposed around the outer periphery of the ring 30. The locking protrusions 18 are partially visible in the view of FIG. 8.

In a particularly preferred embodiment of the present invention, the ring 30 is made of an elastomeric material, such as a material referred to as AMODEL A-1133 HS E R which is available in commercial quantities from Amoco Performance Products, Inc. This material is a 33% glass reinforced heat stabilized polyphthalamide (PPA) which exhibits a high heat distortion temperature, a high flexural modulus and a high tensile strength. Other characteristics are excellent creep resistance and low moisture absorption. Although this particular material is used in a preferred embodiment to the present invention, it should be understood that other materials could possibly be used as long as they exhibit the appropriate characteristics for the particular application of the present invention. However, the only requirements of the material is that it be nonmagnetic and sufficiently elastic to allow the locking protrusions 18 to be deflected slightly in a radially direction to allow them to pass in contact with the internal cylindrical surface 50 before elastically rebounding into the groove 60.

The advantages of the present invention include the easier assembly of the ring into the rotatable component 34 than was possible with the prior art rings. It also assures proper assembly because the locking protrusions 18 cannot rebound into groove 60 unless the locating protrusions 14 are aligned with notches 41 and 42. The alignment of the locating protrusions 14 into the notches, 41 and 42, assures the proper placement of the magneto relative to the rotatable component 34. This is dimensionally assured by making the axial distance between the locating and locking protrusions less than the axial position between the groove 60 and the outer edge of the internal cylindrical surface 50 in which the grooves, 41 and 42, are formed. Therefore, the locating protrusions 14 must move axially into the notches, 41 and 42, to allow the ring 30 to be forced axially into the rotatable component 34 by a sufficient distance to allow the locking protrusions 18 to rebound elastically into the groove 60. When the locating protrusions 14 are within the notches, 41 and 42, it is also assured that the magnets 20 are in their proper positions relative to the rotatable component 34 to assure proper electro-mechanical operation of the electrical generating system of the internal combustion engine.

Figure 9:
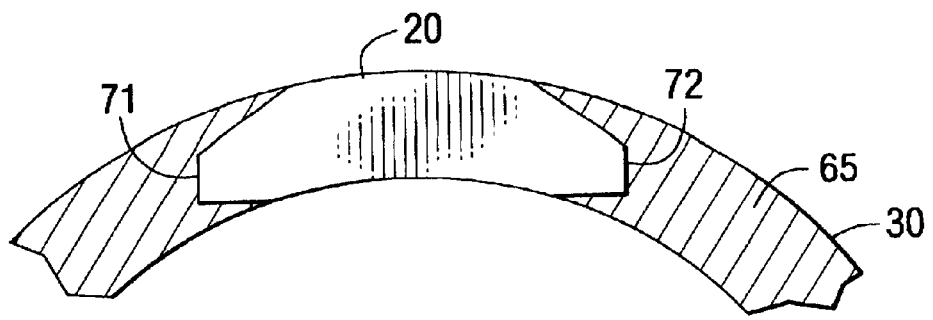
FIG. 9 is a sectional view of a magnet embedded within the elastomeric material of the magnet ring.

It is beneficial to assure that the magnets 20 are permanently contained in their proper positions within the structure of the ring 30. FIG. 9 is a sectional view of a single magnet 20 embedded within the elastomeric material 65 of the ring 30. It can be seen that the two ends, 71 and 72, are shaped to allow the elastomeric material 65 to surround the ends at their radially inward and radially outward surfaces. The arrangements shown in FIG. 9 more effectively hold the magnet 20 in its proper position when it is embedded within the elastomeric material 65. The shape of the magnet 20 illustrated in FIG. 9 performs this function in the manner described immediately above and also by providing increased surface area of the magnet 20 in contact with the elastomeric material 65. Although other shapes of magnets 20 are capable of being used in conjunction with the present invention, the shape shown in FIG. 9 is particularly effective in preventing relative movement between the magnet 20 and the ring 30.

Although the present invention has been described with considerable specificity and illustrated to show a particularly preferred embodiment of the present invention, it should be understood that alternative embodiments are also within its scope.

I claim:

1. A magnet rotor assembly, comprising:

a nonmagnetic ring;

a locating protrusion extending radially outward from a first surface of said ring;

a locking protrusion extending radially outward from a second surface of said ring: and a plurality of permanent magnets embedded within said nonmagnetic ring and spaced circumferentially around said nonmagnetic ring, said nonmagnetic ring being shaped to be received within a rotatable component of an internal combustion engine having an internal cylindrical surface, said locking protrusion being shaped to elastically deflect in a radially inward direction in response to contact between said locking protrusion and said internal cylindrical surface when said nonmagnetic ring is forced axially into said rotatable component and then elastically rebound in a radially outward direction into a groove formed in said internal cylindrical surface after said locating protrusion moves axially into a notch formed in said rotatable component.

2. The assembly of claim 1, wherein:

said nonmagnetic ring is made of an elastomeric material.

3. The assembly of claim 1, wherein:

two locating protrusions extend radially outward from said first surface of said ring.

4. The assembly of claim 3, wherein:

said two locating protrusions are disposed at diametrically opposite positions on said ring.

5. The assembly of claim 1, wherein:

said locking protrusion extends circumferentially around said ring.

6. The assembly of claim 1, further comprising:

said rotatable component of said internal combustion engine.

7. A magnet rotor assembly, comprising:

an elastomeric ring;

a locating protrusion extending radially outward from a first surface of said ring;

a locking protrusion extending radially outward from a second surface of said ring: and a plurality of permanent magnets embedded within said elastomeric ring and spaced circumferentially around said elastomeric ring, said elastomeric ring being shaped to be received within a rotatable component of an internal combustion engine having an internal cylindrical surface, said locking protrusion being shaped to elastically deflect in a radially inward direction in response to contact between said locking protrusion and said internal cylindrical surface when said elastomeric ring is forced axially into said rotatable component and then elastically rebound in a radially outward direction into a groove formed in said internal cylindrical surface after said locating protrusion moves axially into a notch formed in said rotatable component.

8. The assembly of claim 7, wherein:

two locating protrusions extend radially outward from said first surface of said ring.

9. The assembly of claim 8, wherein:

said two locating protrusions are disposed at diametrically opposite positions on said ring.

10. The assembly of claim 9, wherein:

said locking protrusion extends circumferentially around said ring.

11. The assembly of claim 10, further comprising:

said rotatable component of said internal combustion engine.

12. A magnet rotor assembly, comprising:

an elastomeric ring;

two locating protrusions extending radially outward from a first surface of said ring;

a locking protrusion extending radially outward from a second surface of said ring: and a plurality of permanent magnets embedded within said elastomeric ring and spaced circumferentially around said elastomeric ring, said elastomeric ring being shaped to be received within a rotatable component of an internal combustion engine having an internal cylindrical surface, said locking protrusion being shaped to elastically deflect in a radially inward direction in response to contact between said locking protrusion and said internal cylindrical surface when said elastomeric ring is forced axially into said rotatable component and then elastically rebound in a radially outward direction into a groove formed in said internal cylindrical surface after said locating protrusions move axially into a pair of notches formed in said rotatable component.

13. The assembly of claim 12, wherein:

said two locating protrusions are disposed at diametrically opposite positions on said ring.

14. The assembly of claim 13, wherein:

said locking protrusion extends circumferentially around said ring.

15. The assembly of claim 14, further comprising:

said rotatable component of said internal combustion engine.

* * * * *